United States Patent [19]
Hashimoto et al.

[11] Patent Number: 5,107,347
[45] Date of Patent: Apr. 21, 1992

[54] IMAGE DATA INPUTTING SYSTEM FOR IMAGE PROCESSING APPARATUS

[75] Inventors: Yasuhiro Hashimoto, Tokyo; Kohei Sakura, Kanagawa, both of Japan

[73] Assignee: Sony Corporation, Tokyo, Japan

[21] Appl. No.: 547,192

[22] Filed: Jul. 3, 1990

[30] Foreign Application Priority Data

Jul. 24, 1989 [JP] Japan .................................. 1-188833

[51] Int. Cl.⁵ .................................................. H04N 1/40
[52] U.S. Cl. ...................................... 358/448; 358/451
[58] Field of Search ................................ 358/498, 451

[56] References Cited
U.S. PATENT DOCUMENTS

4,733,305 3/1988 Miura et al. ......................... 358/448

Primary Examiner—Edward L. Coles, Sr.
Attorney, Agent, or Firm—Alvin Sinderbrand; William S. Frommer

[57] ABSTRACT

An image processing apparatus receives an input image signal and an input value defining a characteristic of an image to be printed in a dimensional system selected from a plurality of dimensional systems, whereupon, the input value is converted to corresponding numerical values in the other dimensional systems and the received input image signal is processed for conversion to a desired image signal in accordance with the converted numbered values. Such desired image signal is then supplied to a printer for printing the respective image. Further, a display monitors the input value defining a characteristic of the image to be printed and also the converted numerical values in the other dimensional systems.

7 Claims, 8 Drawing Sheets

IMAGE DATA INPUTTING SYSTEM FOR IMAGE PROCESSING APPARATUS

BACKGROUND OF THE INVENTION

1. Field of the Invention

The present invention relates to an image data inputting system for a print image processing apparatus which is capable of processing an input image signal in required stages and outputting the processed signal to printing device.

2. Description of the Prior Art

Technical development of still print image processing apparatus is currently in progress, wherein a video signal (still image signal) of one frame obtained from a video source such as a television camera, video disk, still camera or the like is inputted to an image processor, which then processes the input image signal in various stages to generate a desired printable image signal, and such processed image signal is supplied to a printing device so as to be printed.

Figure 7:
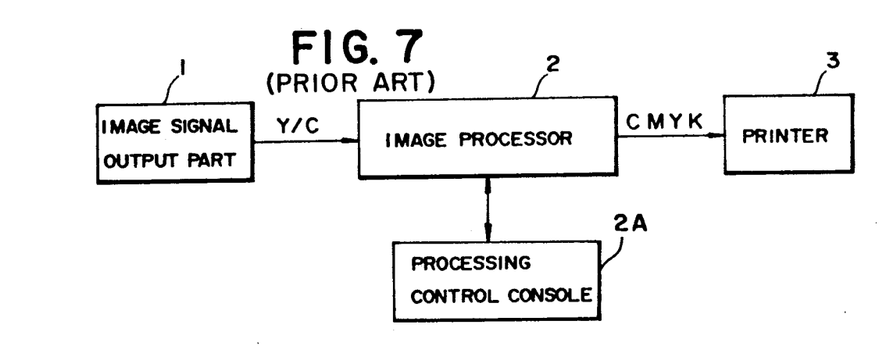
FIG. 7 is an explanatory diagram of an image processing apparatus characteristic of the prior art.

FIG. 7 is a block diagram of an exemplary image processing apparatus, wherein reference numeral 1 denotes an image signal output part for outputting a video signal (still image) of one frame from among the video signals obtained from a television camera or the like. The still image signal outputted in the form of, e.g. luminance signal (Y) and color difference signal (C) is fed to an image processor 2 and then is processed in compliance with commands inputted from a processing control console 2A. The image processing executed with regard to the inputted original still image signal includes noise reduction, luminance or chrominance control, image conversion (enlargement, reduction, rotation, image size change and so forth), and correction of the Y and C signals.

A printer 3 is supplied with the output signal of the image processor 2 which is in the form of to print signals of, e.g., four colors C, M, Y and K (cyan, magenta, yellow and black) after completion of the image processing stages, whereby the operation of printing a color image corresponding to the processed still image signal is executed.

Figure 8:
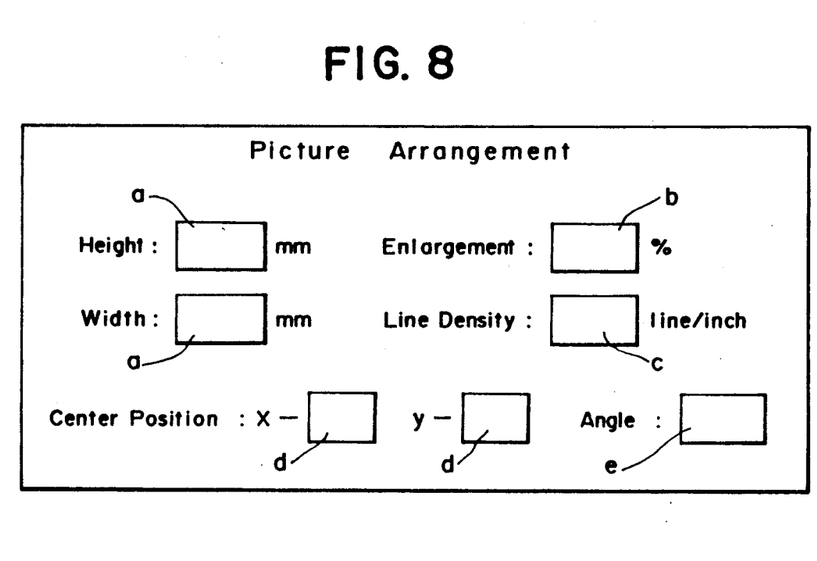
FIG. 8 illustrates an input picture arrangement displayed at the time of image conversion.

When the above-described image conversion is performed in such print image processing apparatus, a picture arrangement is visually represented, as illustrated in FIG. 8, on a control display of the processing control console 2A for setting and inputting characteristics of the image to be printed (hereinafter process values) such as a print image size (input display portion a), an enlargement rate (input display portion b), a scanning line density (input display portion c), a picture center position (input display portion d), and a rotation angle (input display portion e). Image conversion is executed in the image processor 2 in accordance with a set of desired process values inputted by an operator.

Figure 9A:
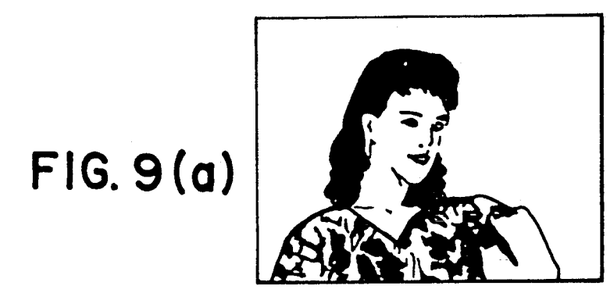
Figure 9B:
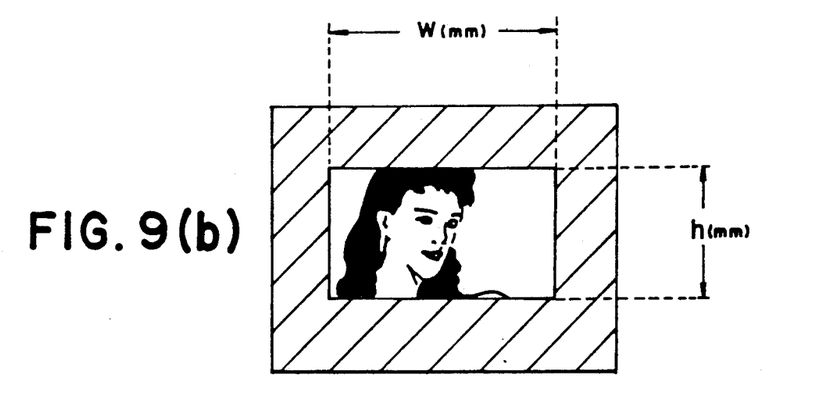

For example, when a print image size is specified with respect to an image signal of FIG. 9(a) (by inputting numerical values to the input display portions a), a height process value h (mm) and a width process value w (mm) are inputted. Then an operation is performed for changing the image size to h×w, as illustrated in FIG. 9(b), i.e., for converting the image signal, which is inputted in obliquely-hatched area, to a margin signal (Y and C signal at white level or a no-signal state). In addition to such image size conversion, other operations for enlargement, rotation and so forth are also performed whereby the inputted original image signal can be converted to a desired image suited to be printed.

In the image size conversion mentioned above, it is customary that the numerical values are inputted with dimensional units of millimeters (mm) as illustrated in FIGS. 8 and 9.

Meanwhile, dimensional systems used generally for an image size in the printing industry include units such as point and pica in addition to millimeters. In addition, in the printing industry, there are some foreign countries where dimensional units of inches are used as well. Such dimensional units have the relationship to one another of 1 (inch)=25.4 (mm)=6 (picas)=72 (points).

Accordingly, in execution of such image processing operation, there frequently occur occasions where the print image size and other characteristics are specified by the use of some other dimensional unit than millimeters. Consequently, it is a disadvantage that the operator needs to convert such other unit to millimeters by means of a calculator or the like each time before inputting a process value. Further, at the time of such numerical conversion, an erroneous input is likely to be provided by some mistake in the calculation.

OBJECTS AND SUMMARY OF THE INVENTION

Accordingly, it is an object of the present invention to avoid the problems mentioned above.

More specifically, it is an object of the present invention to provide an improved image data inputting system for a print image processing apparatus, wherein process values can be inputted in accordance with any selected one of a plurality of dimensional systems.

It is another object of this invention to provide a print image processing apparatus, as aforesaid, with means for converting the inputted process value, to corresponding numerical values in dimensional systems other than the selected dimensional system. Thus, in an apparatus according to the invention, regardless of the dimensional system selected at the time of inputting the process value, a numerical process value corresponding to a predetermined dimensional system for use in the image signal processing operation can be supplied to the image signal processing means. Furthermore, numerical values so converted as to correspond to the respective dimensional systems can be visually represented on image display means together with the inputted process value.

According to one aspect of the present invention, the image processing apparatus comprises means for receiving an input image signal; means for inputting a value corresponding to a characteristic of an image to be printed in a dimensional system selected from a plurality of different dimensional systems; means for detecting the selected dimensional system; conversion means for converting the inputted value to corresponding numerical values in dimensional systems other than the selected system for converting the received input image signal to a desired image signal in accordance with at least one of the numerical values converted by the conversion means; and printing means for printing the desired image signal obtained from the processing means.

According to another aspect of the present invention, the image processing apparatus further has display means for monitoring the value corresponding to a characteristic of an image to be printed inputted thereto from the means for inputting and also the numerical values obtained from the conversion means.

Due to the above construction, the process value inputted accordingly to the dimensional system selected by the operator out of a plurality of prepared dimensional systems is converted to numerical values of the other dimensional systems by the conversion means, and the numerical values thus obtained are visually represented on the display means. In addition, a control operation is so performed that, regardless of the dimensional system selected and used at the time of input, a numerical value based on a predetermined dimensional system selected for calculation can be supplied to the image processing means.

The above, and other objects and features of the present invention will become apparent from the following description which will be given with reference to the illustrative accompanying drawings.

BRIEF DESCRIPTION OF THE DRAWINGS

FIGS. 9 (a) and (b) illustrate image size conversion.

DESCRIPTION OF THE PREFERRED EMBODIMENT

Hereinafter a preferred embodiment of the present invention will be described in detail with reference to the accompanying drawings.

Figure 1:
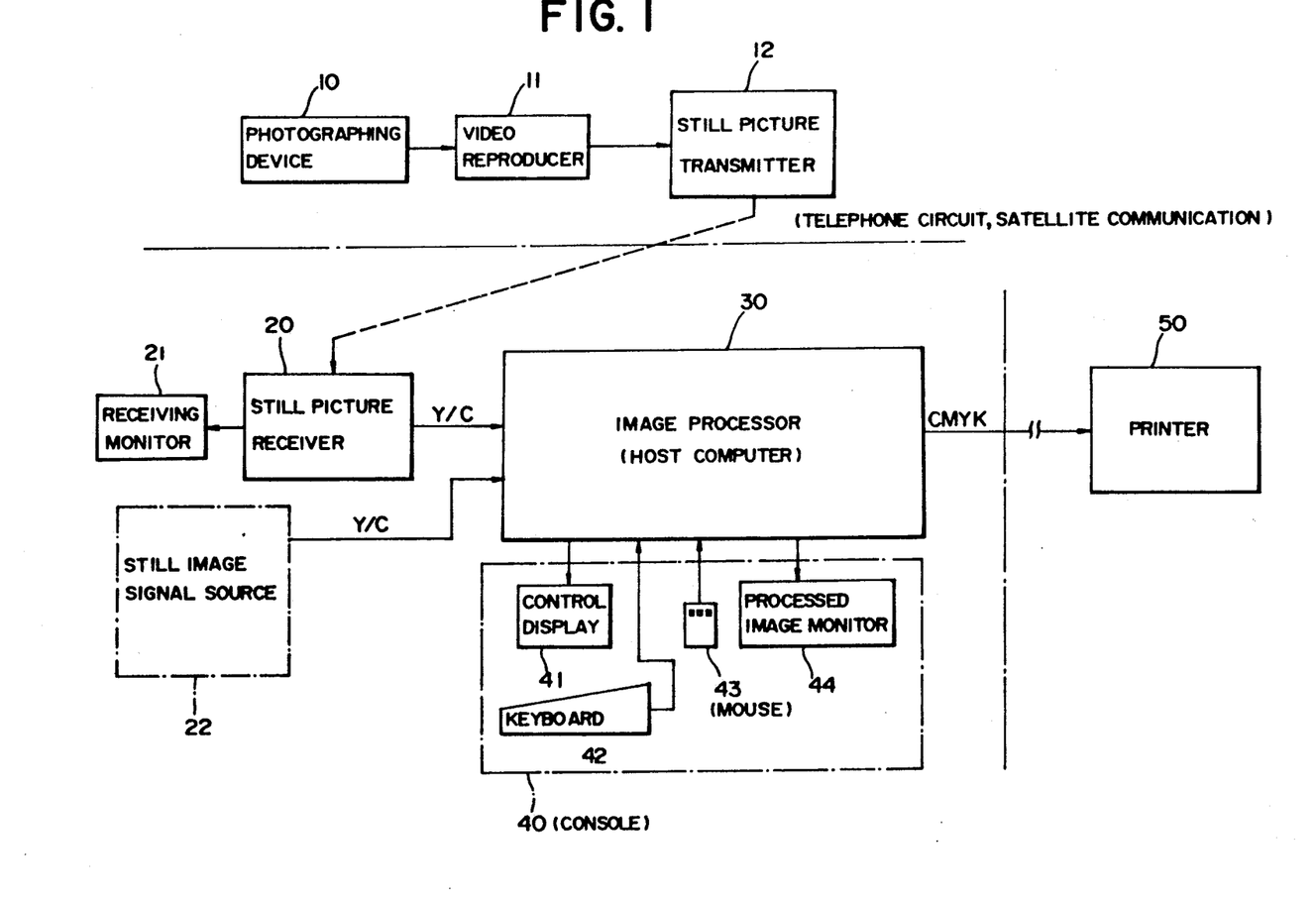
FIG. 1 is a block diagram of a print image processing apparatus according to an embodiment of the present invention.

FIG. 1 is a block diagram of an exemplary image processing apparatus according to an embodiment of the present invention which is constructed so that an image signal transmitted by phototelegraphy can be processed and printed, for example, as a photograph on newsprint. First a description will be given with regard to such image processing apparatus. There are shown in FIG. 1 a photographing device 10 such as a television camera; a video reproducer 11 (TV monitor) for reproducing the video image picked up by the photographing device 10; and a still picture transmitter 12 capable of transmitting, via a telephone circuit, a communications satellite or the like, a desired still picture (color video signal of one frame) out of the series of picked-up video images.

Also shown are a still picture receiver 20 for receiving the picture outputted from the still picture transmitter 12; and a receiving monitor 21 for displaying the received picture. The still image signal received by such picture receiver 20 is composed of a luminance signal (Y) and a color difference signal (C) or (R-Y, B-Y) of one frame, and is inputted either automatically or by manual operation to an image processor 30. Denoted by 22 is a video output appliance such as a video disk unit, video tape recorder, television receiver or the like which is also usable as a still image signal source.

As will be described in detail later, the image processor 30 is so constituted as to perform various operations for the image signal supplied thereto, such as storing the image signal, processing the image, and outputting the same as a print image signal.

Denoted by 40 is a console comprising a control display 41, a keyboard 42, a mouse 43 and a processed image monitor 44. This console 40 is manipulated by an operator to execute various operations of the image processor 30.

Reference numeral 50 denotes a printer which is supplied with the print image data processed by the image processor 30 and converted to print color signals of, e.g., Y, M, C and K (yellow, magenta, cyan and black), corresponding to the desired image.

With the apparatus described above, an image obtained by picking up, for example, a news scene is phototelegraphed directly by the still picture transmitter 12 and then is processed to be ready for printing, whereby the image signal to be printed is supplied to the printer. Thus, the above apparatus is effectively utilizable for an editing system or the like in, for example, a newspaper publishing company.

Figure 2:
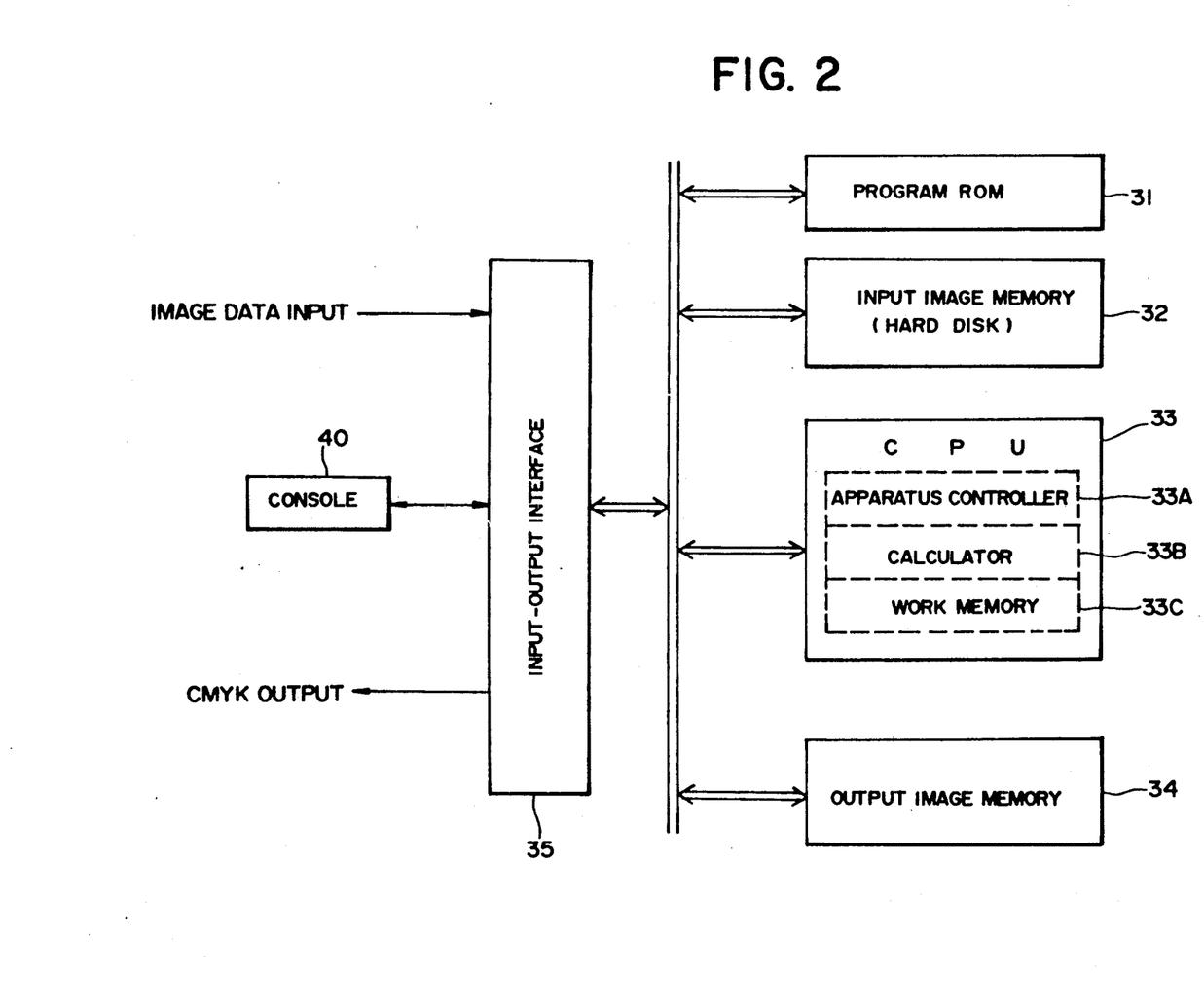
FIG. 2 is a block diagram showing the general structure of an image processor.

In the image processing apparatus shown in FIG. 1, the image processor 30 may be constituted as illustrated specifically for FIG. 2 and serves as a host computer in the entire apparatus. That is, the image processor 30 comprises a program ROM 31 where various control programs are stored; an input image memory (hard disk) 32 where image data inputted from an image source such as the still picture receiver 20 are sequentially stored; a CPU (central processing unit) 33 serving as a controller; an output image memory 34 for storing an output image signal converted to individual color signals C, M, Y and K (cyan, magenta, yellow and black) after being processed for printing; and an input-output interface 35 for transferring the image data to or from the console 40.

The CPU 33 consists of an apparatus controller 33A for controlling the operations of the component elements in accordance with an operation program, a calculator 33B for executing various calculations, and a work memory (main storage device) 33C.

Figure 3:
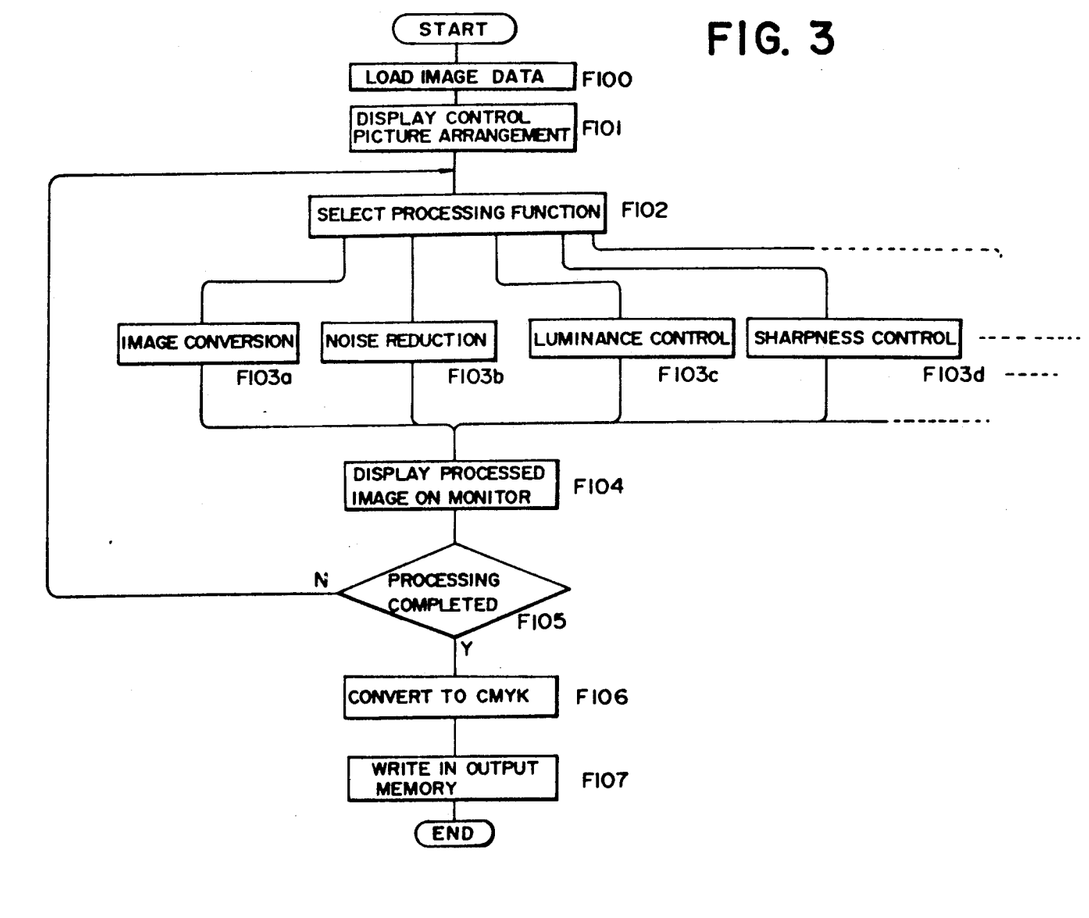
FIG. 3 is a flow chart showing the program performed in the image processor.

Normally the still image signal inputted to such image processor 30 is automatically stored in the input image memory (hard disk) 32 simultaneously with reception of the signal. Then the image data is read out from the input image memory 32 and the image processing routines shown in the flow chart of FIG. 3 are executed principally by the operations in the CPU 33.

In the image processing procedure, first the image data to be processed is loaded from the input image memory 32 into the CPU 33 (F100), and the control picture representing the contents to be processed is visually represented in the form of, for example, a menu on the control display 41 of the console 40 (F101).

The content to be processed is determined (F102) in response to the input from the keyboard 42 or the mouse 43 selected by the operator, and then the required processing routine is executed. That is, there is executed one function selected from among the functions of image conversion, noise reduction, luminance control and so forth denoted by F103a, F103b, F103c.

... respectively. As for the image conversion in F103a, any of enlargement/reduction, center position change, rotation, image size change and so forth can be executed with respect to the inputted original image. Although the functions F103a, F103b, F103c ... are shown parallelly in the flow chart, it is a matter of course that such functions may be executed sequentially in a predetermined order.

The image signal processed in F103 is supplied to the image monitor 44 and then is displayed (F104) so that the operator can confirm the present stage in the processing procedure. When another function is to be executed, the operator manipulates the console 40 to select the desired processing routine again (F105→F102).

After completion of the image processing operations, the image signal composed of luminance (Y) and color difference (C) signals is converted to C, M, Y and K color signals adapted to be printed (F106), and then such signals are stored as output data in the output image memory 34 (F107). Subsequently, the data thus stored are outputted to the printer 50 from the memory 34 either automatically or by manipulation of the console 40, whereby one image is printed with the image signals of four colors C, M, Y and K.

The image processing apparatus shown in FIG. 1 is equipped with the image processor 30 to perform the above operations, so that a desired image can be printed on the basis of the image data (composed of the luminance and color difference signals).

Now a description will be given with regard to the inputting of image data to the image processing apparatus of the present invention.

Figure 4:
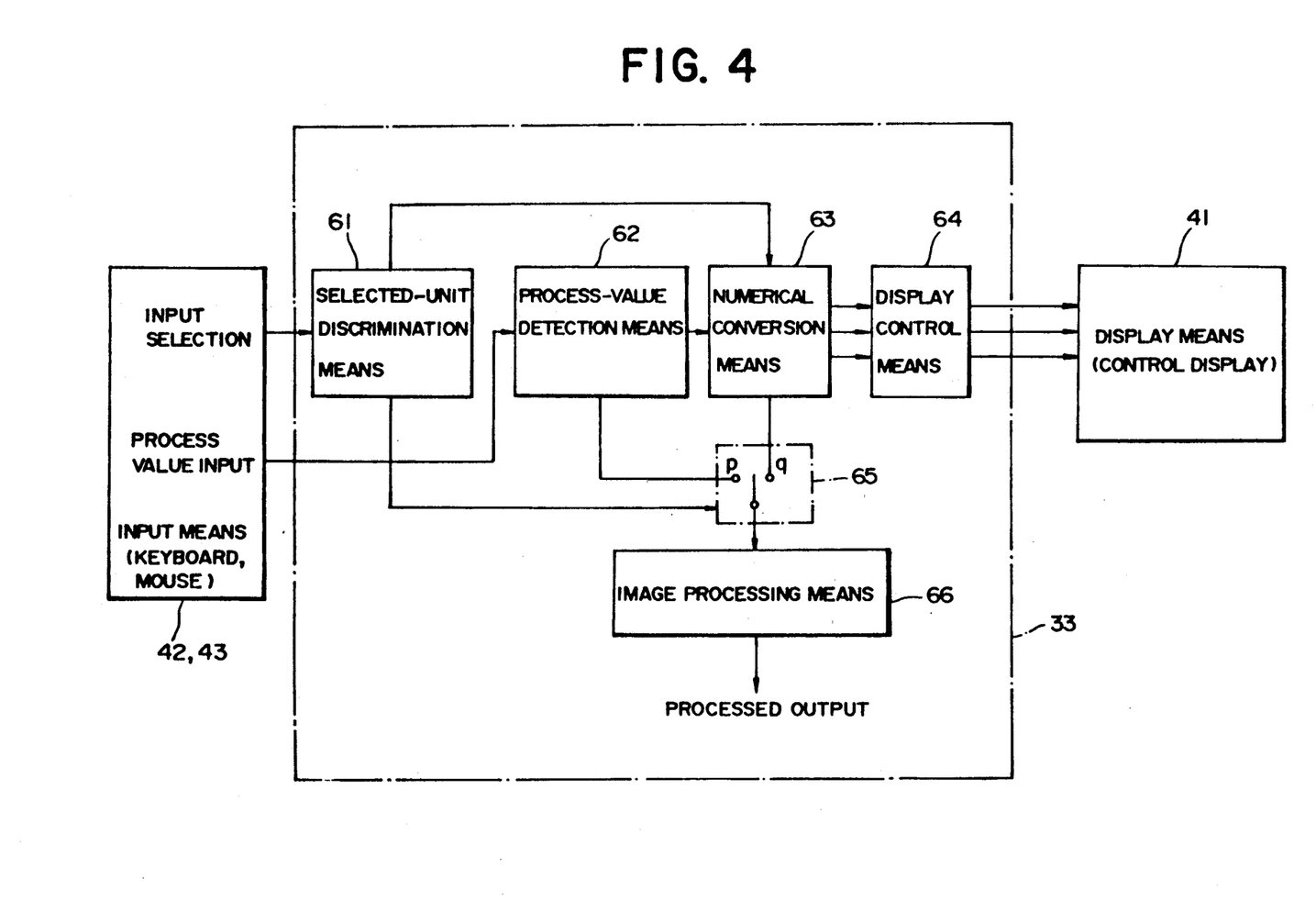
FIG. 4 is a function block diagram showing a preferred embodiment of the image data inputting system of the present invention.

Enclosed in a chain line in FIG. 4 is a function block shown formed of various means but which can be readily constituted by software in the CPU 33. Means for inputting a numerical value corresponding to a characteristic of an image to be printed (process value) in the CPU 33 is represented by a keyboard 42 and a mouse 43. Display means are represented here by a control display 41.

There are also shown selected-unit discrimination means 61 for detecting the dimensional system unit of the input numerical value selected by the mouse 43 or the like; process value detection means 62 for detecting the inputted process value; numerical conversion means 63 for executing calculations on the basis of the inputted process value and its dimensional systems and converting such process value to different numerical values corresponding to other dimensional systems; display control means 64 for visually representing, on the control display 41, respective converted numerical values with corresponding dimensional systems switch means 65 selectively switchable in accordance with the dimensional system unit discriminated by the selected-unit discrimination means 61; and image processing means 66 capable of performing the various image processing operations shown in the flow chart of FIG. 3. The calculation for changing the picture size can be executed on the basis of the process value inputted as a numerical value which corresponds to a unit of, e.g. millimeters.

Due to the above function block constituted in the CPU 33, it becomes possible to readily realize the following operations in this embodiment.

Figure 5:
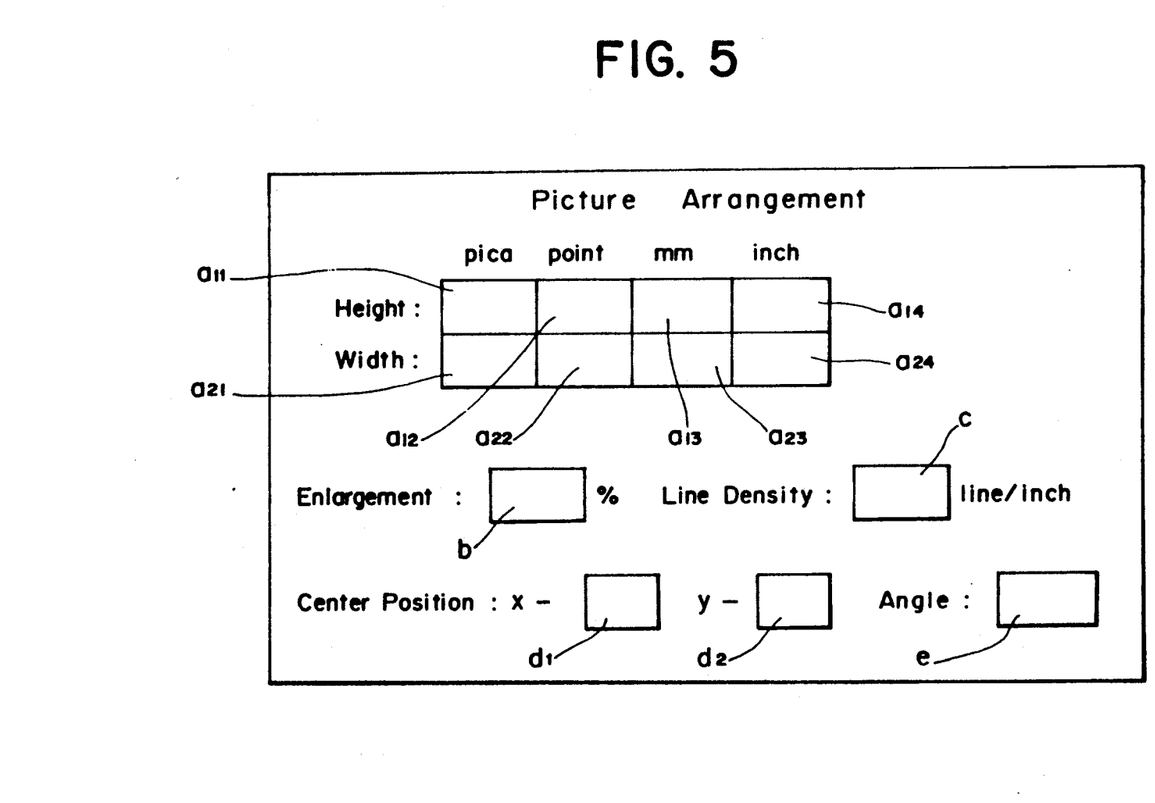
FIG. 5 illustrates an exemplary input picture arrangement used in the image processing apparatus of the present invention.

First, in execution of the image conversion denoted by F103a in FIG. 3, the process-value input picture arrangement of FIG. 5 for example is visually represented on the control display 41, and then the operator performs the same input operation as that for the input picture arrangement of FIG. 8 previously described. As the numerical value input portion a for setting the picture size, there are provided input portions ($a_{11}$–$a_{14}$, $a_{21}$–$a_{24}$) relative to four dimensional units (pica, point, millimeter and inch) for each of the height and the width.

Figure 6:
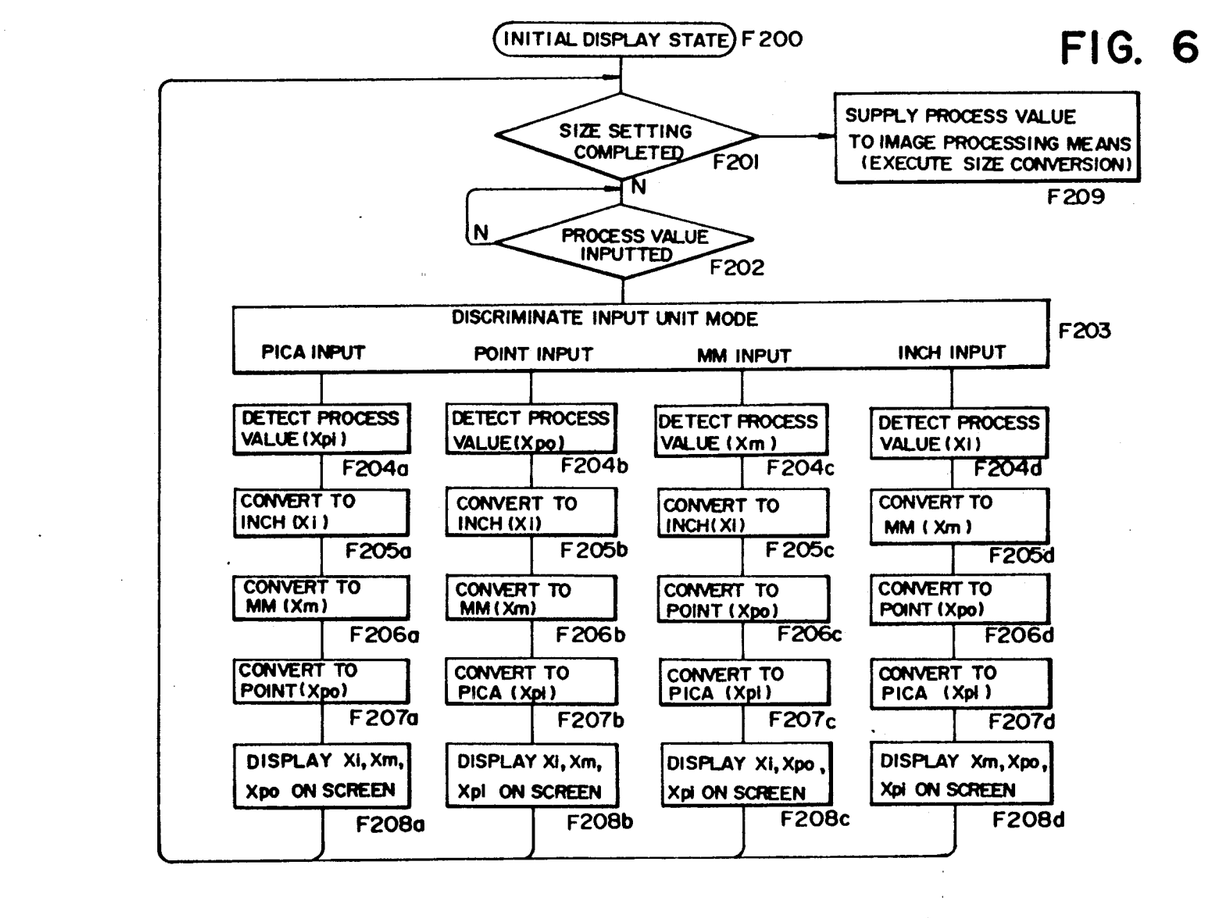
FIG. 6 is a flow chart showing another program performed in the image processor of an embodiment of the present invention.

Regarding such input picture arrangement where the picture size is to be set, the operator may select a desired dimensional unit with respect to both the height and the width, and may input the numerical values based on the selected unit. In response to the input thus entered by the operator the operations shown in FIG. 6 are performed in the function blocks of FIG. 4:

In accordance with the flowchart of FIG. 6, the input picture of FIG. 5 is initially displayed. When a certain numerical value is inputted for setting a picture size (F200–F202), the selected-unit discrimination means 61 serves to discriminate the dimensional unit to which the inputted numerical data corresponds (F203). Such discrimination is rendered possible by detecting, for example, the input position ($a_{11}$–$a_{14}$ and $a_{21}$–$a_{24}$).

Upon detection of the fact that the height data has been inputted with the unit of pica for example (e.g., a process value Xpi has been inputted to a position $a_{11}$), the process value Xpi detected by the processvalue detection means 62 is supplied to the numerical conversion means 63 (F204a), where the process value Xpi is converted to numerical values (Xi, Xm, Xpo) corresponding to the individual dimensional units of inch, millimeter and point respectively (F205a–F207a). Although such numerical conversion can readily be performed using a multiplier, it may also be achieved by preparing ROM data such as a conversion table.

Thus the numerical conversion means 63 produces numerical values (Xpo, Xm, Xi) of the individual dimensional units from the process value Xpi based on the inputted unit of pica, and then such converted numerical values are fed to the display control means 64, so that the numerical values are displayed respectively in the portions $a_{12}$, $a_{13}$, $a_{14}$ on the input picture arrangement of FIG. 5 in the control display 41 (F208a). For example, when Xpi=12, numerical values "12", "144", "50.8" and "2" are displayed in the portions $a_{12}$ to $a_{14}$ respectively.

In case the dimensional unit detected in F203 is point, millimeter or inch, such detected unit is converted to numerical values corresponding to other units similarly to the foregoing case of pica, and such numerical values are then displayed respectively (point in F204b–F208b; millimeter in F204c–F208c; inch in F204d–F208d).

Upon completion of inputting the picture size setting data, the inputted process value is supplied to the image processing means 66. In this embodiment image processing is executed in the dimensional unit of millimeters, the switch means 65 is placed in a p-contact connected state merely when the input is based on the inputted process value has units of millimeters. In this case the inputted process value is supplied directly to the image processing means 66 without any conversion. However, if the inputted process value is based on some other dimensional unit, the q-contact of the switch means 65 is connected, and the numerical value which has been converted to the unit of millimeters by the numerical conversion means 63 is supplied (F209) to the image processing means 66. For example, when numerical values "100" and "200" are inputted as process values to the portions $a_{13}$, $a_{23}$, then such values "100" and "200" are supplied directly as the data representing the height and the width respectively. Meanwhile, when numerical values "2" and "3" are inputted to the portions $a_{12}$ and $a_{22}$ respectively, numerical values "50.8" and "76.2" obtained by inch-to-millimeter conversion are supplied to the image processing means.

After the process data (representing the height and the width of the picture) is supplied to the image processing means 66, image size conversion of the original image signal is executed on the basis of such numerical values, and the size-converted image such as shown in FIG. 9(b) is displayed on the processed image monitor 44 in the console 40. Thus, the processing procedure is carried out in succession from F104 in the flow chart of FIG. 3.

According to the above embodiment of the image processing apparatus, as described, one process vale having a selected dimensional system is converted to corresponding numerical values of other dimensional systems, which are then displayed together with the inputted process value. If there is inputted any process value having a dimensional unit other than a predetermined unit (e.g., millimeter) preset as a unit at the time of calculation for image conversion, such numerical value is converted to a different value based on the predetermined dimensional unit and then is outputted to the image processing means 66. Therefore, even when the operator is requested to process the print image size on the basis of a numerical value corresponding to a dimensional unit of point for example, it is not necessary for him to execute a conversion to the dimensional unit of millimeters each time before inputting the process value, hence facilitating the processing operation.

In the image processing apparatus which is thus capable of selecting a desired one of prepared dimensional systems and inputting a numerical value with such selected dimensional system, it is a matter of course that application thereof is possible not merely to the image size conversion but also to execution of various other processing operations.

As described hereinabove, according to the image processing apparatus of the present invention, one of a plurality of prepared dimensional system is selected and a numerical process value based on such selected dimensional system can be inputted. Therefore, it is not necessary for an operator to perform a numerical conversion of the dimensional system at the time of inputting the process value, hence enhancing the operational efficiency. Furthermore, there is achievable another effect of eliminating any erroneous input that may result from calculation error at the time of such numerical conversion.

What is claimed is:

1. An image processing apparatus comprising:
   means for receiving an input image signal;
   means for inputting a value corresponding to a dimensional characteristic of an image to be printed and which is inputted in accordance with a selected dimensional system differing from a plurality of other dimensional systems;
   means for detecting the selected dimensional system;
   conversion means for converting the value inputted in said selected dimensional system to corresponding numerical values in said other dimensional systems;
   processing means for converting the received input image signal to a desired image signal in accordance with at least one of said numerical values converted to a respective one of said other dimensional systems by said conversion means; and
   printing means for printing said desired image signal obtained from said processing means.

2. An image processing apparatus according to claim 1, further comprising display means for monitoring said value inputted thereto in said selected dimensional system and also said corresponding numerical values in said other dimensional systems as obtained from said conversion means.

3. An image processing apparatus according to claim 2, wherein said input image signal is received from a communication circuit.

4. An image processing apparatus according to claim 3, wherein said printing means prints said desired image signal on newsprint.

5. An image processing apparatus according to claim 1, wherein said input image signal is received from a communication circuit.

6. An image-processing apparatus according to claim 1, wherein said printing means prints said desired image signal on newsprint.

7. An image processing apparatus according to claim 1, further comprising display means for monitoring said desired image signal.

* * * * *